Patented Dec. 1, 1931

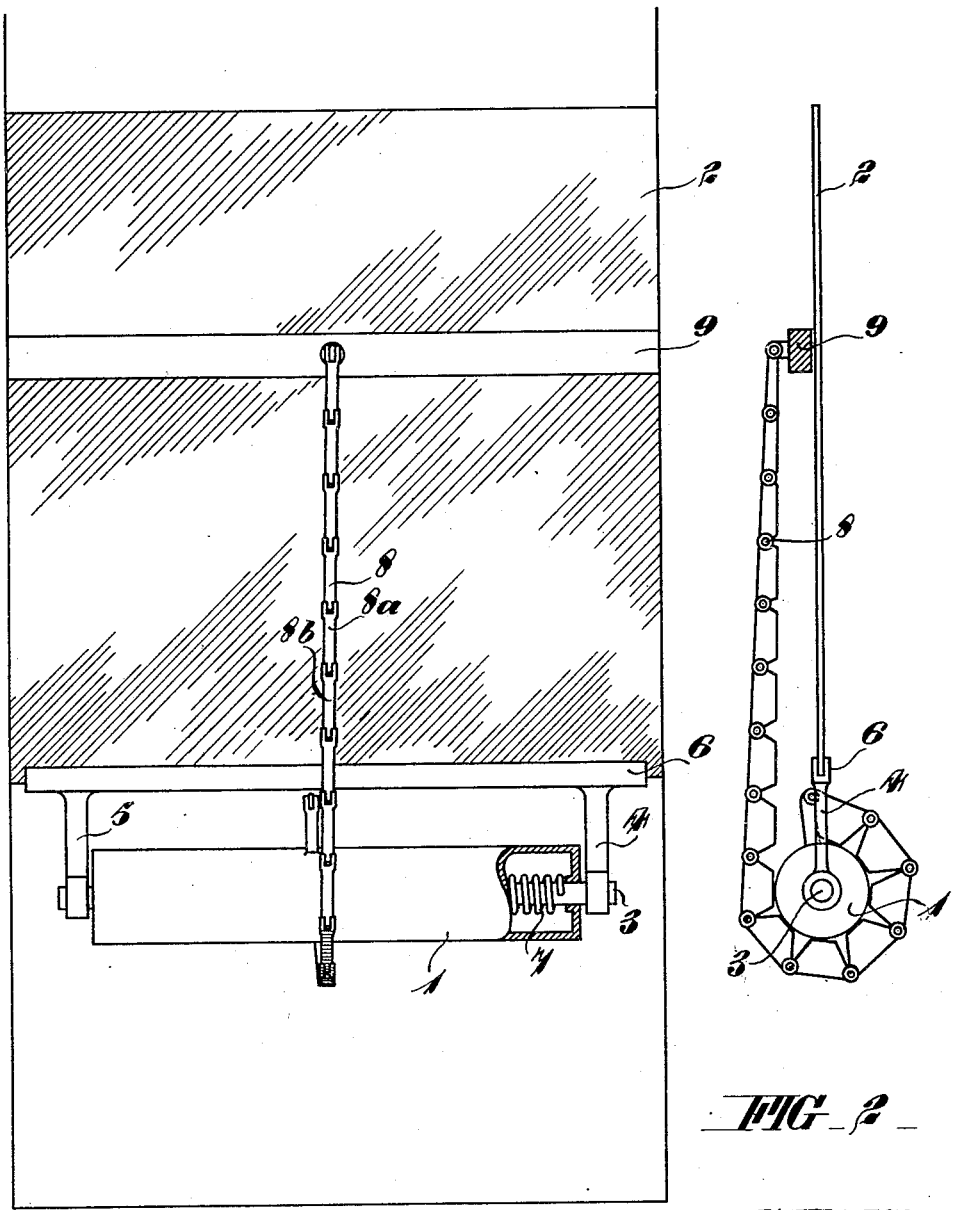

1,834,662

UNITED STATES PATENT OFFICE

HARRY RILEY WEBB AND HARRY NEWTON WEBB, OF GRANTHAM, ENGLAND

DEVICE FOR BALANCING BODIES CAPABLE OF A RISING AND FALLING MOVEMENT

Original application filed June 8, 1929, Serial No. 369,477. Divided and this application filed June 14, 1930. Serial No. 461,245.

This invention comprises an improved device for balancing bodies capable of a rising and falling movement. In the specification of our co-pending application Serial No. 369,477, filed June 8, 1929, of which application this case is a division, means have been described for attaining equilibrium between the opposed forces comprising that due to the weight of a body to be balanced and that exerted by the balancing means at successive positions throughout the range of movement of the body, said means comprising, in one instance, a chain adapted to be wound onto or from a rotatable spring actuated drum, the position taken up by the chain links on passing onto or from said drum causing a cyclic variation in the moments of the forces applied to the drum by the weight of the drum to be balanced.

The principal object of the present invention is to provide means whereby a compensating effect may be obtained in respect of the forces exerted by the balancing means at different positions in the movement of the body, in addition to the above referred to periodic or cyclic variations in the moments of the force applied to the balancing means by the weight of the body.

A further object is to do away with the necessity of independent locking mechanism in connection with displaceable bodies and to provide means whereby the body to be balanced may be moved to the desired position whereupon, if necessary, an automatic movement takes place to such position that equilibrium between the opposing forces is attained.

A still further object of the present invention is to provide means of a simple and cheaply constructed nature functioning to maintain an effective balance at successive and separated positions throughout the range of movement of the body.

Further objects are attained by the novel construction and arrangement of the parts forming the subject of the present invention, which objects will be more fully apparent after consideration of the accompanying specification in connection with the attached drawings wherein:—

Fig. 1 represents a diagrammatic elevation of a traversable window incorporating balancing mechanism in accordance with the present invention and, Fig. 2 is an end view of Fig. 1.

The attached drawings represent by way of example the application of a balancing device to a movable window such for example as those employed in automobiles although the invention is not to be regarded as limited to this purpose.

A rotatable drum 1 is provided below the window 2 and is accommodated upon a stationary spindle 3 carried in bearing brackets 4 and 5 attached to a channel portion 6 secured along the lower edge of the window 2. A coil or similar spring 7 is arranged interiorly of the drum 1 being connected at one end to said drum and at the other end to the stationary spindle 3 and in this manner a rotational force is imparted to the drum 1. A chain 8 is provided secured at one end to the outer surface of the drum 1 and connected at its free end to a stationary transverse cross-bar 9 disposed above the drum 1 in all positions of the window 2. On displacement of the window 2 said chain 8 is wound progressively onto or from the drum 1 and it will be appreciated that the spring 7 interiorly of such drum, imparts a lifting action to the window 2 by virtue of the chain 8 being connected to the stationary cross-bar 9 above the drum.

On displacement of the window 2 the separate links of the chain 8 pass onto or from the drum 1 and cyclic variations are produced in the moments of the force applied by the weight of the window 2 to the spring 7 interiorly of the drum 1 and the arrangement is such that the effective balancing force exerted by the spring 7 always lies intermediate the upper and lower moments of such cyclic variation; as long as this condition is fulfilled it will be appreciated that equilibrium between the opposed forces, comprising the weight of the window 2 and that exerted by the spring 7 may be attained.

The links of the chain 8 are of progressively increasing thickness, those of greatest thickness being at the end of the chain secured to the drum and the thickness of the links decreasing to a minimum at the end of the chain secured to the transverse bar 9. From a consideration of Fig. 2 it will be appreciated that there is an additional progressive, i. e. non-cyclic variation in the moments of the forces applied to the balancing spring 7 interiorly of the drum 1 in accordance with the position of the window 2 in its movement. This progressive change is due to the progressively varying distances between the points of articulation of the adjacent links and the centre of the drum 1 as the chain is wound onto or from the drum.

By suitably proportioning the sizes of the chain links it is possible to compensate for the increasing balancing force of the spring 7 as same becomes more highly tensioned while it will further be appreciated that this progressive variation is additional to the cyclic variation produced in the moments of the forces applied to spring 7 by the different angular positions taken up by the separate links as they pass onto or from the drum 1. The combination of the two sorts of variations in the moments of the force applied to spring 7 results in a cyclic variation having progressively varying upper and lower limits.

Preferably, the arrangement is such that the range of cyclic variation in the moments of the forces applied to the drum 1 is only comparatively small while the progressive variation in the upper and lower limits of such cyclic variation is arranged to compensate for the variation in the balancing force exerted by the spring 7 as same becomes more highly tensioned. The function of the cyclic variation in the moments of the forces applied to the spring 7 may in this case largely reside in the prevention of undesired displacement of the window 2, such as that due to vibrational influences.

Claims:

1. A device for balancing bodies adapted for a rising and falling movement by balancing means exerting an inconstant balancing force comprising a chain having links of progressively increasing thickness, means for applying the balancing force and the force due to the weight of the body to be balanced to the opposite ends of said chain and means whereby, on displacement of the body to be balanced, said chain is passed progressively over a smooth element.

2. A device for balancing bodies adapted for a rising and falling movement by balancing means exerting an inconstant balancing force comprising a chain having links of progressively increasing thickness, means for applying the opposed forces to the opposite ends of said chain and means whereby said chain is passed progressively over a smooth circular element, the positions taken up by the chain links on passing over said element causing a cyclic variation in the moments of the forces applied to the balancing means by the weight of the body to be balanced.

3. A device for balancing bodies adapted for a rising and falling movement by balancing means exerting an inconstant balancing force comprising a chain having links of progressively increasing thickness, a spring actuated drum onto which said chain is progressively wound and a stationary attachment above the spring actuated drum to which the free end of said chain is connected, the positions taken up by the chain links round the drum causing a combined cyclic and a gradual progressive, that is, non-cyclic, variation in the moments of the forces applied to the spring interiorly of the drum by the weight of the body to be balanced.

4. A device for balancing bodies adapted for a rising and falling movement by balancing means exerting an inconstant balancing force comprising a chain having links of progressively increasing thickness, a spring actuated drum onto which the said chain may be progressively wound, a relatively stationary attachment above said drum to which the free end of said chain is connected, and means for mounting said drum below the body to be balanced so as to be displaceable therewith, the position taken up by the chain links around said spring actuated drum causing a combined cyclic and a progressive non-cyclic variation in the moments of the forces applied to the balancing spring by the weight of the body to be balanced.

5. A device for balancing bodies adapted for a rising and falling movement by balancing means exerting an inconstant balancing force comprising a chain having links of progressively increasing thickness, a stationary spindle below the body to be balanced and displaceable therewith, a rotatable drum mounted on said spindle, a spring mounted interiorly of said drum tending to rotate same to cause a lifting force to be imparted to the body to be balanced, means for securing one end of said chain to the outer surface of said drum and a stationary attachment above the spring actuated drum to which the free end of said chain is connected, the positions taken up by the chain links around said drum on displacement of the body causing a combined cyclic and a progressive non-cyclic variation in the moments of the forces applied to the balancing spring by the weight of the body to be balanced.

6. A device for balancing bodies adapted for a rising and falling movement by balancing means exerting an inconstant balancing force comprising a chain having links of progressively increasing thickness, means for applying the opposed forces to the opposite ends of said chain and means whereby said chain is passed progressively over a smooth circular element, the positions taken up by the chain links on passing over said element causing a cyclic variation in the moments of the forces applied to the balancing means by the weight of the body to be balanced, and the effective force exerted by the balancing means always lying intermediate the limits of such cyclic variation.

7. A device for balancing bodies adapted for a rising and falling movement by balancing means exerting an inconstant balancing force comprising a chain having links of progressively increasing thickness, a spring actuated drum onto which said chain is progressively wound and a stationary attachment above the spring actuated drum to which the free end of said chain is connected, the positions taken up by the chain links around the drum causing a combined cyclic and a gradual progressive, that is, non-cyclic, variation in the moments of the forces applied to the spring interiorly of the drum by the weight of the body to be balanced, and the effective force exerted by the balancing means always lying intermediate the limits of such cyclic variation.

HARRY RILEY WEBB.
   HARRY NEWTON WEBB.